3,095,264
DEVICE FOR ASPIRATING AND HEATING A LIQUID FUMIGANT

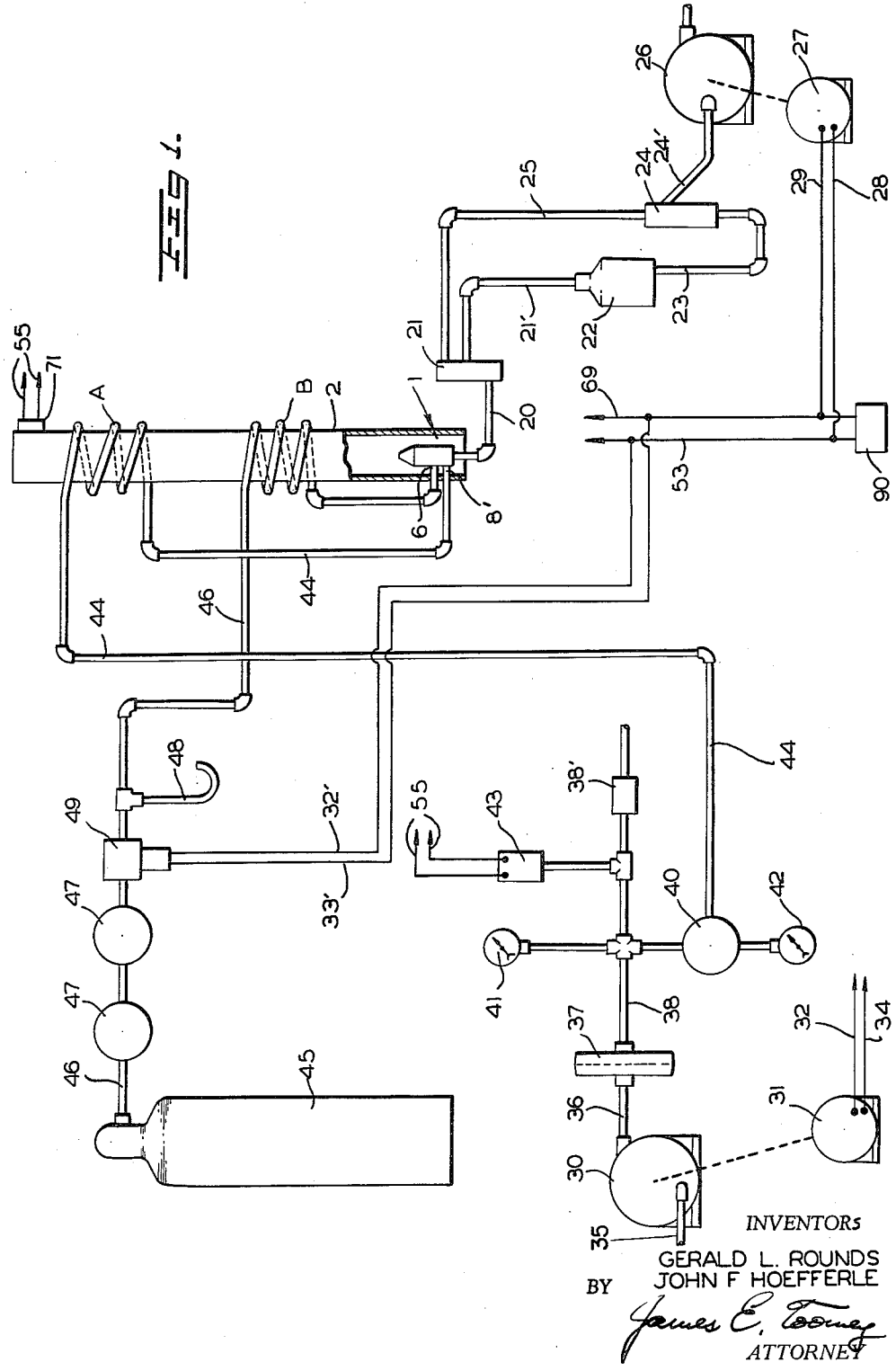

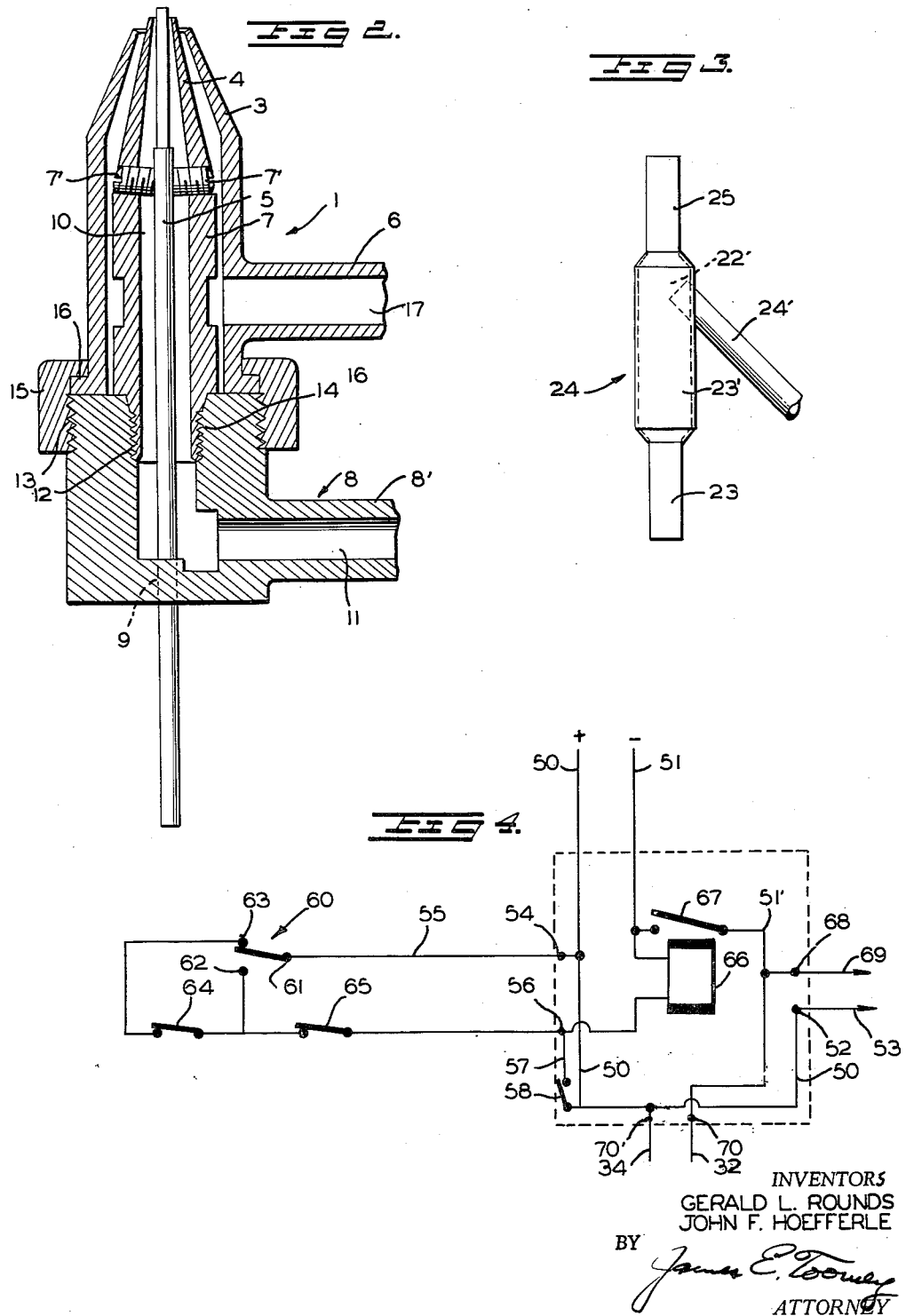

Gerald L. Rounds, Fontana, and John F. Hoefferle, Riverside, Calif., assignors to Kaiser Steel Corporation, Oakland, Calif., a corporation of Nevada
Filed Oct. 9, 1958, Ser. No. 766,292
11 Claims. (Cl. 21—111)

This invention relates to aspirating devices. More particularly, it is concerned with providing a unique method and apparatus for use in producing controlled atmospheric concentrations of a gas, liquid or solid fumigant and the like wherein the fumigant carrier such as a liquid solution is aspirated and heated in a unique metered fashion so that the fumigant will be effectively freed from the carrier and then dispersed in the atmosphere.

In many studies involving corrosive and toxic atmospheres difficulty is encountered since minute quantities of the contaminant cannot be properly metered into the atmosphere. The common method of metering gaseous contaminants is to incorporate them in some form of volume displacement. Besides being restricted to the use of gaseous contaminants, volumetric displacement has the disadvantage of usually being a batch operation. In batch operations the amount of contaminants cannot be precisely controlled to the point where concentrations of the same are effectively metered and determined. The same is also true in the case of dispersion of various fumigants into the atmosphere.

The aforesaid difficulties are effectively overcome by the instant invention and although the instant method and apparatus will be described with particular reference to a fumigating operation it is to be understood that they have many other applications. They may be employed, for example, in the study of corrosive and toxic atmospheres.

Accordingly, it is a primary object of the present invention to provide a novel device for producing controlled atmospheric concentrations of a fumigant on the order of parts per million or parts per billion by volume in the atmosphere into which the fumigant is dispersed.

It is a further object of this invention to provide a novel device for use in producing controlled atmospheric concentrations of a fumigant and the like wherein an atomizer-burner assembly is employed in a unique fashion for separating the material to be dispersed in the atmosphere such as a fumigant from a liquid solution containing the fumigant and thereafter dispersing the fumigant into the atmosphere.

It is a further object of this invention to provide a novel apparatus for use in dispelling into the atmosphere or a closed chamber controlled concentrations of a fumigant and the like wherein the apparatus includes an atomizer-burner which effectively breaks down and frees the fumigant from a liquid solution containing the fumigant together with novel means for controlling the operation of the atomizer-burner in an efficient and safe fashion.

It is a further object of this invention to provide a novel apparatus for use in introducing controlled atmospheric concentrations of a fumigant and the like into the atmosphere or a closed chamber wherein an atomizer-burner unit is employed for freeing the fumigant from a carrier such as a liquid solution containing the fumigant by aspirating the liquid solution and thereafter heating the same together with novel means for operation the unit in a substantially continuous fashion.

It is a further object of this invention to provide a novel method for producing controlled atmospheric concentrations of a fumigant and the like wherein a liquid solution containing the fumigant is successively passed through aspirating and heating zones for a sufficient interval of time to effect a vaporization of the liquid solution and a complete freeing of the fumigant therefrom in a concentrated dispersion while at the same time passing a combustion supporting gas through the aspirating zone and into the heating zone to aspirate the liquid solution and simultaneously passing into and igniting a gaseous fuel in the heating zone.

It is a further object of this invention to provide a novel fumigating apparatus which is readily portable and one which can be cheaply and easily made from readily available materials.

Other objects and advantages of the instant invention will become more apparent from a review of the following detailed description when taken in conjunction with the appended drawings wherein:

FIGURE 1 is an over-all schematic view of the novel fumigating apparatus of the instant invention;

FIGURE 2 is a sectional view of the combined aspirating and burner unit used with the fumigating apparatus shown in FIGURE 1;

FIGURE 3 is an elevational view of an airlift device used with the fumigating apparatus shown in FIGURE 1; and FIGURE 4 is a schematic diagram of a suitable electrical control circuit that may be used for operating the various parts of the apparatus disclosed in FIGURE 1.

With further reference to the drawings and in particular FIGURE 1, the fumigating device of the instant invention generally comprises a combination aspirator and burner unit 1 disposed within the lower portion of the chimney or flue 2. In a preferred embodiment of the invention the combined aspirator or atomizer and burner unit 1 includes concentrically arranged outer nozzle 3, inner nozzle 4 and a capillary tube 5. Integrally formed with nozzle 3 is a nipple 6 provided with opening 17 which serves as a fuel inlet port. Opening 17 communicates with the space 7 disposed between nozzle 3 and nozzle 4. Both of these nozzles are suitably mounted upon the base 8 of the unit 1 and nozzle 4 can be adjusted with respect to nozzle 3 as clearly indicated in the drawings. Base 8 has an opening 9 at the bottom thereof through which the capillary tube 5 is inserted. The capillary tube 5 extends upwardly within the main central chamber 10 for the aspirating gas until it protrudes slightly above the top of nozzles 3 and 4. Chamber 10 further communicates with the opening 11 in the nipple 8' in base member 8, this opening serving as the inlet port for a suitable aspirating gas. Base member 8 is further provided with interiorly and exteriorly disposed threaded portions 12 and 13 respectively. Threaded portions 12 engage the correspondingly threaded portions 14 at the base of nozzle member 4 for adjusting nozzle 4 thereon while exterior threaded portions 13 engage the threads of nut 15. Since nozzle 3 contains the nut engaging shoulders 16 at the lower portion thereof, nozzle 3 will be held firmly in place when these shoulders are disposed intermediate the upper portion of the nut and the upper portion of base member 8 and the nut 15 is drawn tightly against base 8. Adjusting screws 7' disposed in suitable apertures in nozzle 4 may also be used to center capillary tube 5 in chamber 10.

When a suitable gaseous fuel, such as hydrogen or acetylene, is introduced under pressure through the opening 17 in nipple 6, it will pass up through the outermost chamber 7 between nozzles 4 and 3 until it reaches the tip of the aspirator and burner unit where it can then be ignited. When a suitable combustion supporting gas, such as oxygen or air, is introduced under pressure in the opening 11 in nipple 8', it will pass through chamber 10 and serve as a convenient aspirating medium for a liquid solution containing a fumigant disposed in the capillary tube 5.

The capillary tube 5 is connected by means of the line 20 to a constant level reservoir 21. The liquid solution containing the desired gas, liquid or solid fumigant dissolved therein reaches the reservoir from a conventional supply source, such as bottle 22, by means of a conduit 23, an airlift unit 24 and a conduit 25. As indicated particularly in FIGURE 3, airlift unit 24 comprises the central housing 23' having a large chamber 22' into which air is fed from the pipe 24' and the fumigant containing liquid solution from pipe 23. The suction produced by the air from pipe 24 draws the solution from pipe 23 through chamber 22' and out through pipe or conduit 25 to reservoir 21. Air is introduced into pipe 24' by means of a small piston type pump 26 commonly used to aerate home aquariums. The pump is driven by a small electric motor 27 connected by leads 28 and 29 to a suitable power source by means of lines 53 and 69.

Air for atomizing or aspirating the liquid solution containing a fumigant in the atomizer and burner unit 1 is supplied by the small air compressor 30 driven by the motor 31. Motor 31 is connected to the power source by means of lines 32 and 34. The air is obtained from line or conduit 35. In the event oxygen is used for aspirating the liquid instead of air, the compressor 30 is replaced by a conventional cylinder of compressed oxygen similar to cylinder 45, which is for fuel. The air or oxygen is then supplied through line 36 past a felt oil eliminator and trap 37 of a conventional design to prevent later fouling of the atomizer-burner unit 1. From air trap 37 the atomizing gas passes through conduit 38 and then through a conventional air pressure regulator 40 of conventional design which assists in maintaining the air flow at the desired rate. Conventional pressure gauges 41 and 42 may also be used, pressure gauge 41 indicating the pressure of the gas received from the compressor and gauge 42 indicating the pressure of the gas after it leaves the regulator 40. Also mounted in conduit 38 is a conventional relief valve 38' and a pressure responsive switch unit 43 the function of which will be described more fully hereinafter.

From the pressure regulator 40 the aspirating gas passes through line 44, portions of which are wrapped about the flue or chimney 2 at the point A until the gas reaches and passes through the opening 11 at the base of the aspirator and burner unit 1.

Hydrogen or acetylene used for combustion purposes is initially obtained from a cylinder 45. Because of the low pressure required, the compressed gas may be reduced in pressure as it leaves the cylinder 45 by having the same pass through conduit 46 in which is disposed a plurality of pressure regulators 47 mounted in series for better regulation. A simple U-tube 48 indicates the final hydrogen pressure. Also disposed in line 46 is a solenoid-operated valve 49, the function of which will be described more fully hereinafter. Conduit 46 communicates with the opening 17 in outer nozzle 3 of the combination aspirator and burner unit 1. Conduit 46, however, as in the case of conduit 44 also has portions thereof wrapped about the outside of the chimney or flue 2 at the point B, all as indicated more fully in FIGURE 1. Conduits 44 and 46 are advantageously wrapped about the chimney 2 at the points A and B so as to preheat the oxygen or air and the fuel used in the aspirator and burner unit 1. This in turn tends to gasify any condensate in the lines 44 and 46 and particularly condensate in the air line 44, which might hinder vaporization of the fumigant bearing solution.

The bottom of the flue 2 is also usually left open to provide access for a large amount of air for combustion and vaporization or aspiration. It is also to be noted that reservoir 21 provides a constant head from which the capillary tube 5 of the aspirating burner unit 1 draws the liquid solution containing the fumigant. The exact type of the reservoir is not important so long as the reservoir solution surface is below the level of the burner to prevent syphoning from the reservoir to the burner. Any overflow from the reservoir is carried by line 21' down to the solution containing bottle 22.

Various safety devices are also employed to cover several events in the operation of the apparatus when personnel are not in the area to observe its operation. These safety devices are incorporated in the control circuit shown in FIGURE 4. This control circuit comprises the main lines 50 and 51 leading to a suitable source of electric power. Line 50 is connected by means of terminal 70' to lead 34 for motor 31 which drives the compressor 30. Connected to line 50 by means of the terminal 52 is the lead line 53. Lead line 53 is connected to the solenoid-operated valve 49 in the hydrogen supply conduit 46 by means of line 32' and to the line 28 leading to the motor 27 for driving the air pump 26. Also connected to the line 50 by means of the terminal 54 is the line 55. Line 55 is further connected to line 51 by means of the terminal 56. Also extending from terminal 56 is the line 57 which contains the starting switch 58 and line 57 is also connected to line 50. Disposed in line 55 is a double-acting thermo bypass switch 60. The blade of this switch is alternately engageable with terminals 61 and 62 and 61 and 63. Finally, line 55 contains a second thermo switch 64 and a pressure-operated switch 65, the latter switch being mounted in the unit 43 disposed in conduit 38 for the air supply. Disposed in line 51 intermediate the power source and the terminal 56 is a relay 66, which controls the operation of the switch 67 disposed in auxiliary line 51'. Auxiliary line 51' is connected at the terminal 68 to the line 69 and at terminal 70 to the line 32 also leading to the motor 31 which drives the compressor 30. Line 69 is connected to the one side of the solenoid-operated valve 49 by means of line 33' and to the one side of motor 27 for operating the air pump 26 by line 29. The operation of the fumigating apparatus is as follows.

Upon the closing of the operating or starting switch 58, the circuit will be completed through lines 50 and 57, terminal 56 and line 51. This also causes energization of relay 66 and a closing of switch 67. The blade of switch 60 when set to the thermo bypass position closes the gap across terminals 62 and 61 and then it will keep the part of line 55, which includes thermo switch 64, out of the circuit. Upon the energization of the relay 66 in the circuit, which occurs immediately after the closing of the switch 58 as indicated above, the terminals of the switch 67 will be closed. This will effect a closing of the circuit to the motor 31 for driving the compressor 30 through lines 32 and 34. The air pressure produced by the compressor immediately closes pressure sensitive switch 65 which completes the circuit from line 50 through terminal 54, through switch 60, through terminal 62, through switch 65 and directly to coil 66 back to line 51. As soon as the foregoing circuit is complete, switch 58 may be opened and the entire device will continue to operate. At the same time the circuit will be closed to the motor 27 for driving the air pump 26 through the medium of lines 53, 69, 28 and 29 and the solenoid valve 49 in the hydrogen supply line 46 will be opened, whereby fuel can flow from the tank 45 to the atomizer-burner unit along with air or oxygen from line 44.

Upon the actuation of the air pump 26, solution containing the fumigant will be caused to flow through the capillary tube 5 to the burner tip. Upon the ignition of the hydrogen fuel, proper aspiration and separation of the fumigant from the fumigant containing solution will be initiated and continued. As soon as the temperature of the burner is raised to a pre-set operating limit, the thermo switch 64, which is set to operate upon a predetermined heat content in the chimney 2, is energized. Switch 64 may be conveniently mounted in the unit 71 affixed to the chimney. Upon energization of switch 64 the circuit including switch 64, line 55 and terminal 63 will be energized. At this time thermo bypass switch 60 may be actuated to contact terminals 63 and 61, which puts the thermo switch 64 in the circuit including line 55, switches 60, 64 and 65, coil 66 and line 51.

In the event that the air compressor fails, the flame from the aspirator-burner unit 1 will become excessively long and thus will produce a fire hazard. To prevent this condition from causing a fire, the air pressure control switch 65 mounted in unit 43 will open upon the drop in pressure in the line 38. This in turn will take the relay 66 out of the circuit thereby opening switch 67 and breaking the circuit to the solenoid-operated valve 49 whereby the valve will close. As the valve closes it will cut off the line 46 from the atomizer-burner unit 1. Since the motor 27 which drives the airlift pump 26 also is connected to the main power source through switch 67, the opening of this switch will simultaneously deenergize motor 27 and deactivate the pump 26. Opening of switch 67 also cuts the power to the motor 31 for compressor 30.

In the event that the flame in the atomizer-burner unit 1 should become extinguished for any reason, the thermo switch 64 disposed in the fixture 71 mounted on the side of the chimney 2 will break contact when the temperature drops below a pre-set value. When thermo switch 64 opens, it will also break the circuit to the relay 66 and cause switch 67 to open, thereby deactivating the compressor and pump motors and deenergizing solenoid-operated valve 49. In the event the fuel supply of hydrogen should run out, the burner will be extinguished and the chimney temperature will drop again below the pre-set value. Thermo switch 64 will then open and break the circuit to the motors 27 and 31 and valve 49 in the manner indicated above. If desired, a suitable timer mechanism 90 may also be connected to the lines 53 and 69. This timer will stop when the power is shut off by the operation of either of the safety devices set forth above. This in turn will provide a record of the operational time so that proper notes can be made regarding the extent of the fumigation which has been effected.

The instant unit is particularly adapted for use in producing atmospheric concentrations of the fumigant in the order of parts per million or parts per billion by volume in the atmosphere. As indicated above, the atomizing or aspirating burner is also preferably mounted near the bottom of the flue or chimney 2 which is open at both ends. A chimney having a diameter of approximately 1¼ inches and a length of approximately 15 inches has been found to be quite satisfactory for most operations. In any event, the length of the chimney should be such as to provide sufficient retention time and heat to completely vaporize the aqueous or liquid solution containing the fumigant so as to free the dissolved fumigant therefrom. For most operations the following conditions will also prevail. The fuel is fed under a pressure of 1½ to 2 inches water column at the burner, while the combustion supporting gas or oxygen used for atomizing is fed to the unit 1 under a pressure of between about 2 to 16 p.s.i.g. and the pressure of this gas is regulated to provide a steady air flow through the atomizer-burner of between about 1840 and 3550 cc. per minute. For most operations also the concentration of the fumigant in the solution should be such that an aspirating rate of between about 0.2 and 2 cc. of solution per minute will provide the approximate fumigant concentration desired in the atmosphere, although changes in the solution aspirating rate can be made by varying the air flow through the atomizer-burner. With respect to the fumigant carrying liquid supplied as a liquid solution to the tube 5 of unit 1, water may be used as the solvent and liquid fumigants which produce liquid or solid aerosols as the fumigant. Water is advantageously used since it can be readily aspirated and will not be objectionable after passing through the flame. Other types of liquids which can be used as the fumigant carrier are carbon tetrachloride, carbon tetrabromide, or other liquids in which the fumigant is soluble and which carrier does not interfere with the fumigation being conducted, while the fumigants may comprise hydrogen fluoride, hydrogen bromide, hydrogen chloride, sulfuric acid, sulfurous acid, sodium fluoride, or other gas, liquid or solid which forms a true solution with the carrier.

Furthermore, in most operations concentrations micrograms to 350 milligrams of solid fumigant per cc. of liquid carrier, or 50 micrograms to 250 milligrams of liquid fumigant per cc. of liquid carrier will be satisfactory to produce the desired concentrations of the fumigant in the atmosphere. However, it is understood that these concentrations are merely illustrative of concentrations to be used and the concentrations may be varied depending on the circumstantces in each case.

Since the solution flow rate can be altered by changing the air pressure and the air supply through the unit 1, it will be obvious that varying amounts of fumigant can be readily and easily supplied to the area being fumigated. This makes the jet fumigator of the instant invention quite versatile. If a fumigation concentration in the atmosphere out of the range of that obtainable by altering the air flow and pressure is desired, the solution concentration of the fumigant can be altered to obtain the desired fumigation concentration in the atmosphere.

From the above it is obvious that the proposed device has exceptional flexibility and that the concentration of the fumigant within the area to be fumigated can be held between 0 and several thousand parts per million by volume with an accuracy of plus or minus 5% of any chosen value.

The instant device is also unique in that it is a continuously operating fumigator and it can be constructed from readily available materials. Finally, all parts of the device may be conveniently mounted in a cabinet whereby the apparatus is made readily portable.

An advantageous embodiment of the invention has been herein disclosed and described. It is obvious that various changes and modifications may be made therein without departing from the spirit and scope thereof as defined in the appended claims wherein what is claimed is:

1. In a fumigating device the combination of a flue open at both ends, an atomizer and burner unit mounted within said flue and adjacent one of the open ends thereof, said atomizer and burner unit including concentrically arranged gaseous fuel and aspirating gas nozzles and a capillary tube, said nozzles and tube being in open communication with the interior of the flue, means for supplying gaseous fuel in a heated condition to said first-mentioned nozzle including a gaseous fuel conduit portions of which are disposed in surface-to-surface contact with said flue, means for supplying an aspirating gas to said second-mentioned nozzle and means for supplying a liquid solution containing a fumigant to said capillary tube, whereby upon the aspiration and heating of said liquid solution containing a fumigant by said atomizer and burner unit the fumigant will be freed from said liquid solution and pass through the other open end of said flue.

2. In a fumigating device the combination of a flue open at both ends, an aspirating and burner unit mounted within said flue and adjacent one of the open ends thereof, said aspirating and burner unit including concentrically arranged gaseous fuel and aspirating gas nozzles and a capillary tube, said nozzles and tube being in open communication with the interior of the flue, means for supplying gaseous fuel to said first-mentioned nozzle, means for supplying an aspirating gas in a heated condition to said second-mentioned nozzle, said last-mentioned means including an aspirating gas conduit portions of which are disposed in surface-to-surface contact with said flue, and means for supplying a liquid solution containing a fumigant to said capillary tube whereby upon the aspiration and heating of said liquid solution containing the fumigant by said aspirating and burner unit the fumigant will be freed from said liquid solution and pass through the other open end of said flue.

3. In a device of the type described the combination of flue means, an aspirating and burner unit mounted within said flue means and adjacent an open end thereof, said aspirating and burner unit including a gaseous fuel nozzle, an aspirating gas nozzle and a capillary tube all disposed in close proximity to each other, said nozzles and tube being in open communication with the interior of said flue means, means for supplying a gaseous fuel to said first-mentioned nozzle, means for supplying an aspirating gas in a heated condition to said second-mentioned nozzle, said last-mentioned means including an aspirating gas conduit, portions of which are disposed in surface-to-surface contact with said flue means, means for supplying a liquid solution containing a fumigant to said capillary tube whereby upon the aspiration and heating of said liquid solution containing a fumigant by said aspirating and burner unit said fumigant will be released from said liquid solution and pass through the other open end of said flue means, electro-mechanical means for operating all of said gas supply means and said liquid solution supply means including thermo responsive switch means disposed adjacent another open end of said flue means and operable upon a predetermined decrease in the heat in said flue means to deactivate said electro-mechanical means and cut off the supply of said gaseous fuel said aspirating gas and said liquid solution to said aspirating and burner unit.

4. A device as set forth in claim 3 including a switch means for placing said thermo responsive switch means in circuit after said thermo responsive switch means has been initially put into operation by an increase in temperature.

5. In a device of the type described the combination of flue means, an aspirating burner unit mounted within said flue means, and adjacent one of the open ends thereof, said aspirating burner unit including a gaseous fuel nozzle, an aspirating gas nozzle and a capillary tube all disposed in close proximity to each other, said nozzles and tube being in open communication with the interior of said flue means, means for supplying a gaseous fuel to said first-mentioned nozzle, means for supplying an aspirating gas in a heated condition to said second-mentioned nozzle, said last-mentioned means including an aspirating gas conduit, portions of which are disposed in surface-to-surface contact with said flue means, means for supplying a liquid solution containing a fumigant to said capillary tube whereby upon the aspiration and heating of said liquid solution containing a fumigant by said aspirator burner unit said fumigant will be released from said liquid solution, electro-mechanical means for operating all of said gas supply means and said liquid solution supply means including a pressure responsive switch disposed in the aspirating gas supply means, said pressure responsive switch being operable upon a predetermined decrease in the pressure of the aspirating gas being supplied to the aspirating nozzle for deactivating said electro-mechanical means and cutting off the supply of gaseous fuel and aspirating gas and said liquid solution to said aspirating burner unit.

6. In a fumigating device the combination of flue means, an aspirating burner unit mounted in said flue means and adjacent one of the open ends thereof, said aspirating and burner unit including gaseous fuel and aspirating gas nozzles and a capillary tube all disposed in close proximity to each other and in open communication with the interior of said flue means, means for supplying a gaseous fuel to said first-mentioned nozzle, means for supplying an aspirating gas in a heated condition to said second-mentioned nozzle, said last-mentioned means including an aspirating gas conduit, portions of which are disposed in surface-to-surface contact with said flue means, means for supplying a liquid solution containing a fumigant to said capillary tube, whereby upon the aspiration and heating of said liquid solution by said aspirating burner unit said fumigant will be released from said liquid solution and pass through the other open end of said flue means, electro-mechanical means for operating said gaseous fuel, said aspirating gas and liquid solution supply means, said electro-mechanical means including a thermo responsive switch means disposed adjacent said flue means and operable upon a predetermined decrease in the heat in said flue means for deactivating said electro-mechanical means and cutting off the supply of gaseous fuel, aspirating gas and liquid solution to said aspirating burner unit and said electro-mechanical means further including a pressure responsive switch means operable independently of said thermo responsive switch means upon a decrease in the pressure of the aspirating gas being supplied to the aspirating nozzle for deactivating said electro-mechanical means.

7. A fumigating device of the type set forth in claim 6 including a switch means operable after said device has been initially set in operation for placing the thermo responsive switch means in circuit.

8. A device of the type described comprising the combination of flue means and an aspirating burner unit disposed in said flue means, said aspirating burner unit also being disposed adjacent one of the open ends of said flue means, means for supplying a gaseous fuel to said unit, means for supplying an aspirating gas to said unit, conduit means for preheating said gaseous fuel and aspirating gas prior to supplying said fuel and gas to the unit and means for supplying a liquid solution containing a substance to be dispersed in the atmosphere to said unit whereby upon the aspiration and heating of said liquid solution by said aspirating burner unit the said substance will be freed from said liquid solution, electro-mechanical means for activating all of said gas supply means and said liquid solution supply means, said electro-mechanical means also including means for deactivating all of said supply means in the event of a failure in at least one of said gas supply means.

9. A fumigating device of the type described comprising the combination of a flue open at both ends, an atomizer burner unit mounted within said flue and adjacent to one of the open ends thereof, said atomizer burner unit including gaseous fuel and aspirating gas nozzles and a capillary tube all disposed in close proximity to each other and in open communication with the interior of the flue, means for supplying gaseous fuel to said first-mentioned nozzle, means for supplying an aspirating gas in a heated condition to said second-mentioned nozzle, said aspirating gas supply means including a conduit, portions of which are disposed in surface-to-surface contact with said flue, means for supplying a liquid solution containing a fumigant to said capillary tube, said last-mentioned means including airlift means, whereby upon the aspiration and heating of said liquid solution by said atomizer and burner unit the fumigant will be released from said liquid solution in predetermined concentrations.

10. In a fumigating device of the type described the combination of a flue open at both ends thereof, an aspirating burner unit mounted within said flue and adjacent one of the open ends thereof, said aspirating burner unit comprising a gaseous fuel nozzle, an aspirating gas nozzle and a capillary tube all of which are mounted in close proximity to each other and in open communication with the interior of the flue, means for supplying a gaseous fuel in a heated condition to said first-mentioned nozzle including a gaseous fuel conduit portions of which are wrapped about said flue, means for supplying an aspirating gas in a heated condition to said second-mentioned nozzle including an aspirating gas conduit portions of which are also wrapped about said flue, means for supplying a liquid solution containing a fumigant to said capillary tube whereby upon the aspiration and heating of said liquid solution by said aspirating burner unit the fumigant will be freed from said liquid solution, electro-mechanical means for operating all of said gas supply and liquid solution supply means including a thermo responsive switch means and a pressure responsive switch means, said thermo responsive switch means being operable upon a predetermined decrease in the heat in the flue to deactivate said electro-mechanical means and said pressure responsive switch means being operable upon a decrease in the pressure of the gas being supplied to second-mentioned nozzle for also deactivating said electro-mechanical means independently of said thermo responsive switch means.

11. A device as set forth in claim 10 including a switch means for placing said thermo responsive switch means in circuit during the initial operation of said device.

References Cited in the file of this patent

UNITED STATES PATENTS

| | | |
|---|---|---|
| 441,690 | McClain | Dec. 2, 1890 |
| 523,581 | Klinger | July 24, 1894 |
| 1,386,125 | Loeb | Aug. 2, 1921 |
| 2,052,871 | Cowin | Sept. 1, 1936 |
| 2,067,622 | Smith | Jan. 12, 1937 |
| 2,181,095 | Ness | Nov. 21, 1939 |
| 2,333,124 | Robertson | Nov. 2, 1943 |
| 2,367,316 | Skinner | Jan. 16, 1945 |
| 2,369,900 | Jennings | Feb. 20, 1945 |
| 2,397,165 | Shephard | Mar. 26, 1946 |
| 2,473,435 | Luzader | June 14, 1949 |
| 2,537,761 | Howard | Jan. 9, 1951 |
| 2,626,187 | Toftmann | Jan. 20, 1953 |
| 2,659,623 | Wilson | Nov. 17, 1953 |
| 2,784,466 | Burns | Mar. 12, 1957 |
| 2,869,188 | Cameto | Jan. 20, 1959 |

OTHER REFERENCES

Walker et al., Principles of Chemical Engineering, p. 214, 3rd ed., McGraw-Hill Book Co., Inc., New York.